United States Patent
Alpert et al.

(10) Patent No.: US 10,420,027 B2
(45) Date of Patent: Sep. 17, 2019

(54) MULTIBAND POWER SAVE CONTROL FOR WIRELESS NETWORKING

(71) Applicant: Intel Corporation, Santa Clara, CA (US)

(72) Inventors: Yaron Alpert, Hod Hasharoni (IL); Laurent Cariou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 15/614,795

(22) Filed: Jun. 6, 2017

(65) Prior Publication Data

US 2018/0160370 A1 Jun. 7, 2018

Related U.S. Application Data

(60) Provisional application No. 62/429,345, filed on Dec. 2, 2016.

(51) Int. Cl.
*H04W 52/02* (2009.01)

(52) U.S. Cl.
CPC ... *H04W 52/0212* (2013.01); *H04W 52/0225* (2013.01); *H04W 52/0206* (2013.01); *H04W 52/0216* (2013.01); *H04W 52/0229* (2013.01); *H04W 52/0235* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/21* (2018.01); *Y02D 70/22* (2018.01); *Y02D 70/26* (2018.01)

(58) Field of Classification Search
CPC ......... H04W 52/0206; H04W 52/0229; H04W 52/0235; H04W 52/0212; H04W 52/0225; Y02D 70/00; Y02D 70/142; Y02D 70/146
See application file for complete search history.

(56) References Cited

U.S. PATENT DOCUMENTS

| | | | |
|---|---|---|---|
| 2010/0002610 A1* | 1/2010 | Bowser | G06F 1/3203 370/311 |
| 2012/0008581 A1* | 1/2012 | Kojima | H04W 52/0225 370/329 |
| 2014/0254349 A1* | 9/2014 | Jia | H04W 28/04 370/225 |

\* cited by examiner

*Primary Examiner* — Kevin C. Harper
(74) *Attorney, Agent, or Firm* — Schwegman Lundberg & Woessner, P.A.

(57) ABSTRACT

A wireless station (STA) for operation in a wireless network communicates over a first band and a second band, where operation of the first band includes operation of a first set of band-specific medium access control processing and physical-layer circuitry of the STA, and wherein operation of the second band includes operation of a second set of band-specific medium access control processing and physical-layer circuitry of the STA. The STA implements a power-save policy for the STA to coordinate power-save operations between the first band and the second band, where the power-save policy calls for a change in operational parameters of at least the second band. The STA generates a power-save request message for transmission to a remote device over the first band wherein a power-save request message indicates the change in operational parameters for the second band according to the power-save policy.

12 Claims, 12 Drawing Sheets

MULTIBAND POWER SAVE CONTROL FOR WIRELESS NETWORKING

PRIORITY CLAIM

This application claims the benefit of U.S. Provisional application No. 62/429,345, filed Dec. 2, 2016, the disclosure of which is incorporated by reference herein.

TECHNICAL FIELD

Aspects of the disclosure relate generally to information processing and communications and, more particularly, to wireless networking using radio-access networks (RANs). For instance, some embodiments relate to client stations (STAs) and access point stations (APs) that operate according to the Institute of Electrical and Electronic Engineers (IEEE) 802.11 family of wireless networking standards. Some embodiments in particular relate to the IEEE 802.11ax, 802.11ah, and 802.11ay standards currently under development, and to similar implementations. Some embodiments relate to wireless networks including 3GPP (Third Generation Partnership Project) networks, 3GPP LTE (Long Term Evolution) networks, 3GPP LTE-A (LTE Advanced) networks, and 3GPP LTE-Advanced Pro networks, in which user equipment UE devices and enhanced node-B (eNB) devices operate. Some embodiments relate to fifth-generation (5G) communications that may use millimeter-wave frequencies.

BACKGROUND

The proliferation of mobile internet devices (smartphones, tablets, laptops, and other devices) as well as high bandwidth apps and large file downloads has led to an increasing need for wireless links with larger capacity to support real-time and non-real-time consumption of large amounts of data, including multimedia data. To this end, one approach that is being developed is multiband aggregation (including multi communication interface aggregation in some cases). Multiband aggregation facilitates the concurrent use of two or more different radio interfaces by a single STA/UE device to increase its data-communications capacity. Each radio interface generally has its own corresponding hardware and firmware components integrated into the device. Although they may be operated cooperatively to enhance data throughput for a common application, the different radio interfaces have distinct medium access control (MAC) and physical interface (PHY) layers which, conventionally, have been separately controlled and managed due to their different operational characteristics and compliance with different RAN standards.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
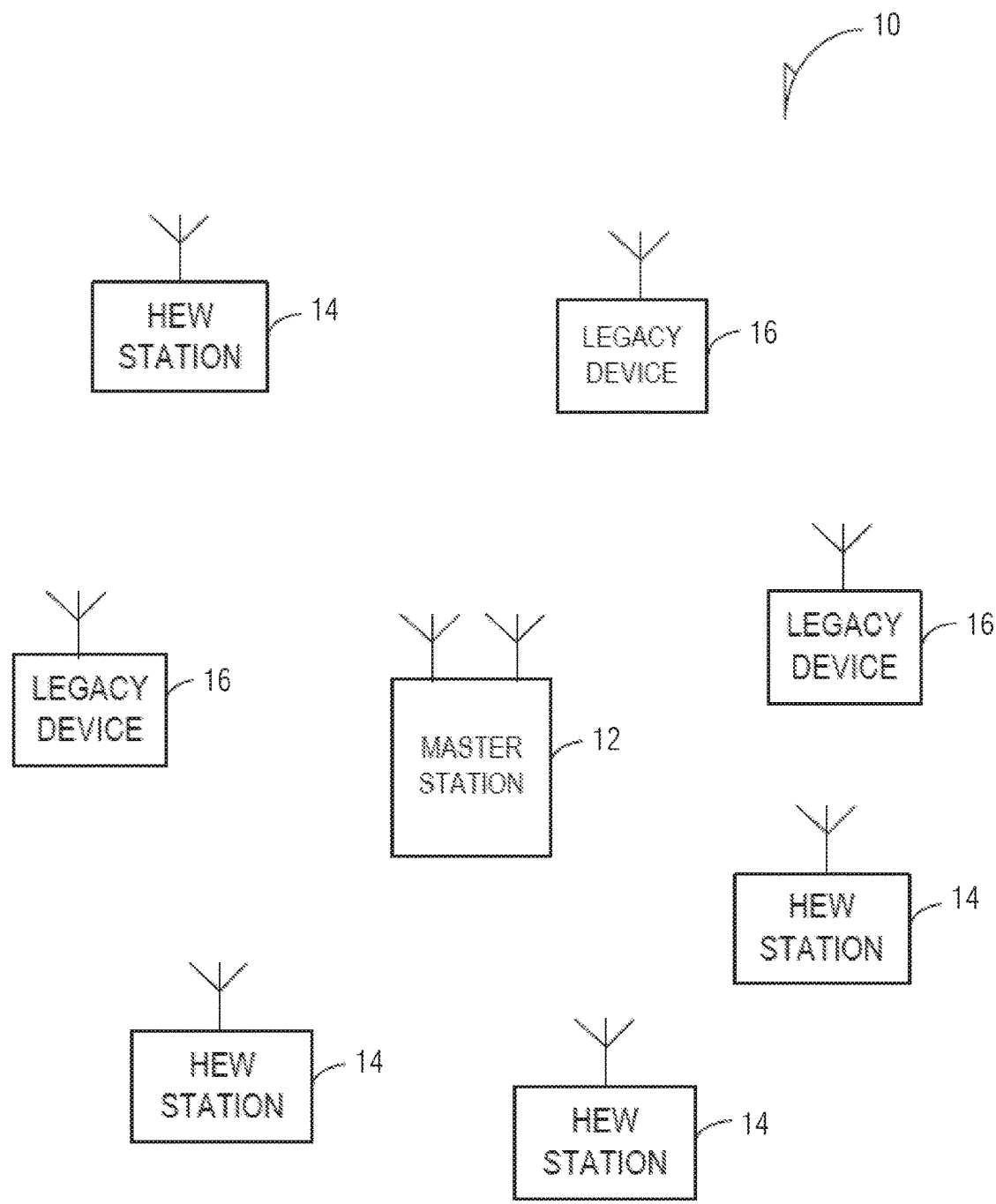
FIG. 1A is a high-level system diagram illustrating a wireless local area network (WLAN) in accordance with some embodiments.

The following description and the drawings sufficiently illustrate specific examples to enable those skilled in the art to practice them. A number of examples are described in the context of Wi-Fi and 3GPP communication systems and components thereof. It will be understood that principles described herein are applicable in other types of communication systems, such as Wi-Max networks Wi-Gig networks, Bluetooth or other personal-area networks (PANs), Zigbee or other home-area networks (HANs), wireless mesh networks, and the like, as well as in device-to-device (D2D) communications contexts, without limitation, unless expressly limited by a corresponding claim.

Given the benefit of the present disclosure, persons skilled in the relevant technologies will be able to engineer suitable variations to implement principles of the inventive aspects in other types of communication systems. For example, it will be understood that a base station or e-Node B (eNB) of a 3GPP context is analogous, generally speaking, to a wireless access point (AP) of a WLAN context. Likewise, user equipment (UE) of a 3GPP context is generally analogous to mobile stations (STAs) of WLANs. Various diverse examples may incorporate structural, logical, electrical, process, and other differences. Portions and features of some examples may be included in, or substituted for, those of other examples. Inventive aspects set forth in the claims encompass all presently-known, and after-arising, equivalents of those claims. For the sake of brevity, unless specific types of devices are specifically called out, in any described example, WLAN terminology (i.e., STA, AP) will be used to refer in a general sense to analogous devices of other RANs such as UEs, base stations, etc.

Some embodiments are directed to a solution for supporting multiband power save and power-save resource allocation. In the present context, the term band refers to a specific communication interface at RAN facilities and functionality on a device that may share medium access control (MAC), physical layer (PHY) and RF frontend circuitry and firmware. For example, a multiband device may have a first band for a 2.4 GHz WiFi communication interface, a second band for a 5 GHz WiFi communication interface, a third band for a 45-GHz WiFi communication interface, a fourth band for a 60-GHz WiFi communication interface, a 700 MHz LTE communication interface, and a fourth band for 1.9 GHz LTE communication interface. Technologies have been proposed to facilitate communication interface aggregation among different bands to support data communications for a common application on the device using two or more of the available bands, including bands of the same type of communication interface, or of different communication interfaces of a single communication device, at the same time.

Mobile STA and UE devices are battery powered and, as such, there is a need to conserve energy. Networking radio circuitry is a major consumer of power; accordingly, a variety of power-saving schemes have been proposed, and are currently under development. One approach allows some portion, or all of, the RF circuitry of a STA to enter a sleep mode when idle. The RF circuitry may awaken at a defined interval to listen for paging signaling, or to check with the AP whether any communications directed to the STA are being buffered for reception by the STA. In this type of approach, the AP cooperates with the STA to buffer data for the STA, send beacons or paging signals, etc.

Various sleeping modes for STA devices have been proposed. For example, a STA may enter a deep sleep mode in which the radio communications circuitry, baseband, and MAC processors are all off, or the STA may enter a shallow sleep mode in which the baseband and MAC processors are on, but the radio communications circuitry is turned off. To address medium-contention problems in dense deployments of STAs where it is possible for many STAs to wake up at the same time to download buffered data, various solutions have been proposed. For instance, a target wakeup time (TWT) may be configured for individual STA devices during association with the AP. The AP may distribute TWTs for STA devices to minimize the chance for collisions resulting from simultaneous wakeups.

Conventionally, different power-save policies and parameters are independently applied for each of the supported bands. This represents a lost opportunity to achieve power savings at the STA device, and reduce resource utilization at the associated AP.

According to some example embodiments, a common power save operating mode is deployed across multiple bands by using a common power save policy, signaling and operating methodology. These embodiments establish a multiband common power save operating mode and a common power-save operating-mode flow control.

Advantageously, power consumption at the STA may be reduced since the STA may shut down one or more operating bands while maintaining a minimal activity at a single operating band, the primary band. Primary band status is dynamic: each of the various bands may take over the primary-band role as the common power save operating mode is carried out. The non-primary bands are referred to as secondary bands for purposes of the present discussion.

As an example, communications throughput and medium utilization may be further optimized by the AP as it aggregates all secondary-band resource allocations and transmits them in a single packet only at one primary operating band. Also broadcast and advertising can be sent only at the primary band to reduce reception latency. In a related example, the resource allocation made by the AP may be sent on the band found to be the most reliable. In another related advantage, the multiband operation may be entirely transparent to the upper layers.

FIG. 1A illustrates a WLAN 10 in accordance with some aspects. The WLAN may comprise a basic service set (BSS) 10 that may include a master station 12, which may be an AP, a plurality of high-efficiency (HE) wireless (e.g., IEEE 802.11ax/ay) STAs 14 and a plurality of legacy (e.g., IEEE 802.11n/ac/g/a/b/sd/ah) devices 16.

The master station 12 may be an AP using the IEEE 802.11 to transmit and receive. The master station 12 may be a device using peer-to-peer communications with other devices and using 802.11 and/or 3GPP cellular standards. The master station 12 may use other communications protocols instead or in addition to aforementioned standards like Bluetooth Low Energy. The IEEE 802.11 protocol may be IEEE 802.11ax, 802.11ad, or the like. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). In some aspects, the 802.11 system may include an antenna structure operated as one or more arrays to generate Orbital Angular Momentum (OAM) beams of varying OAM modes.

The legacy devices 16 may operate in accordance with one or more of IEEE 802.11 a/b/g/n/ac/ad/af/ah/aj, or another legacy wireless communication standard. The legacy devices 16 may be STAs or IEEE STAs. The HE STAs 14 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol.

The master station 12 may communicate with legacy devices 16 in accordance with legacy IEEE 802.11 communication techniques. In some examples, the master station 12 may also be configured to communicate with HE STAs 14 in accordance with legacy IEEE 802.11 communication techniques.

In some aspects, a HE frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some examples, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some examples the bandwidth of the subchannels may be based on a number of active subcarriers. In some examples the bandwidth of the subchannels are multiples of 26 (e.g., 26, 52, 104, etc.) active subcarriers or tones that are spaced by 20 MHz. In some examples the bandwidth of the subchannels is 256 tones spaced by 20 MHz. In some examples the subchannels are multiple of 26 tones or a multiple of 20 MHz. In some examples a 20 MHz subchannel may comprise 256 tones for a 256 point Fast Fourier Transform (FFT).

A HE frame may be configured for transmitting a number of spatial streams, which may be in accordance with MU-MIMO. In some examples a HE frame may be configured for transmitting streams in accordance with antenna structures described herein and operated as one or more arrays or antenna structure(s) to generate Orbital Angular Momentum (OAM) beams of various OAM modes. In accordance with some IEEE 802.11-family examples, a master station 12 may operate as a master station which may be arranged to contend for a wireless medium (e.g., during a contention period) to receive exclusive control of the medium for an HE control period. In some examples, the HE control period may be termed a transmission opportunity (TXOP). The master station 12 may transmit a HE master-sync transmission, which may be a trigger frame or HE control and schedule transmission, at the beginning of the HE control period. The master station 12 may transmit a time duration of the TXOP and sub-channel information. During the HE control period, HE STAs 14 may communicate with the master station 12 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 12 may communicate with HE stations 14 using one or more HE frames. During the HE control period, the HE STAs 14 may operate on a sub-channel smaller than the operating range of the master station 12. During the HE control period, legacy stations refrain from communicating. In other examples the HE STAs 14 may communicate with the master station 12 in accordance with an antenna array or structure(s) of the types discussed below for generating Orbital Angular Momentum (OAM) beams of various OAM modes. This may be full multiplexing where n data streams are mapped to n OAM modes; or fewer than n data streams are mapped to n OAM modes for partial diversity and partial multiplexing; or one data stream may be mapped to n OAM modes for full diversity, depending on channel conditions and the objectives of the system as discussed more fully below.

The master station 12 may also communicate with legacy stations 16 and/or HE stations 14 in accordance with legacy IEEE 802.11 communication techniques. In some examples, the master station 12 may also be configurable to communicate with HE stations 14 outside the HE control period in accordance with legacy IEEE 802.11 communication techniques, although this is not a requirement.

Figure 1B:
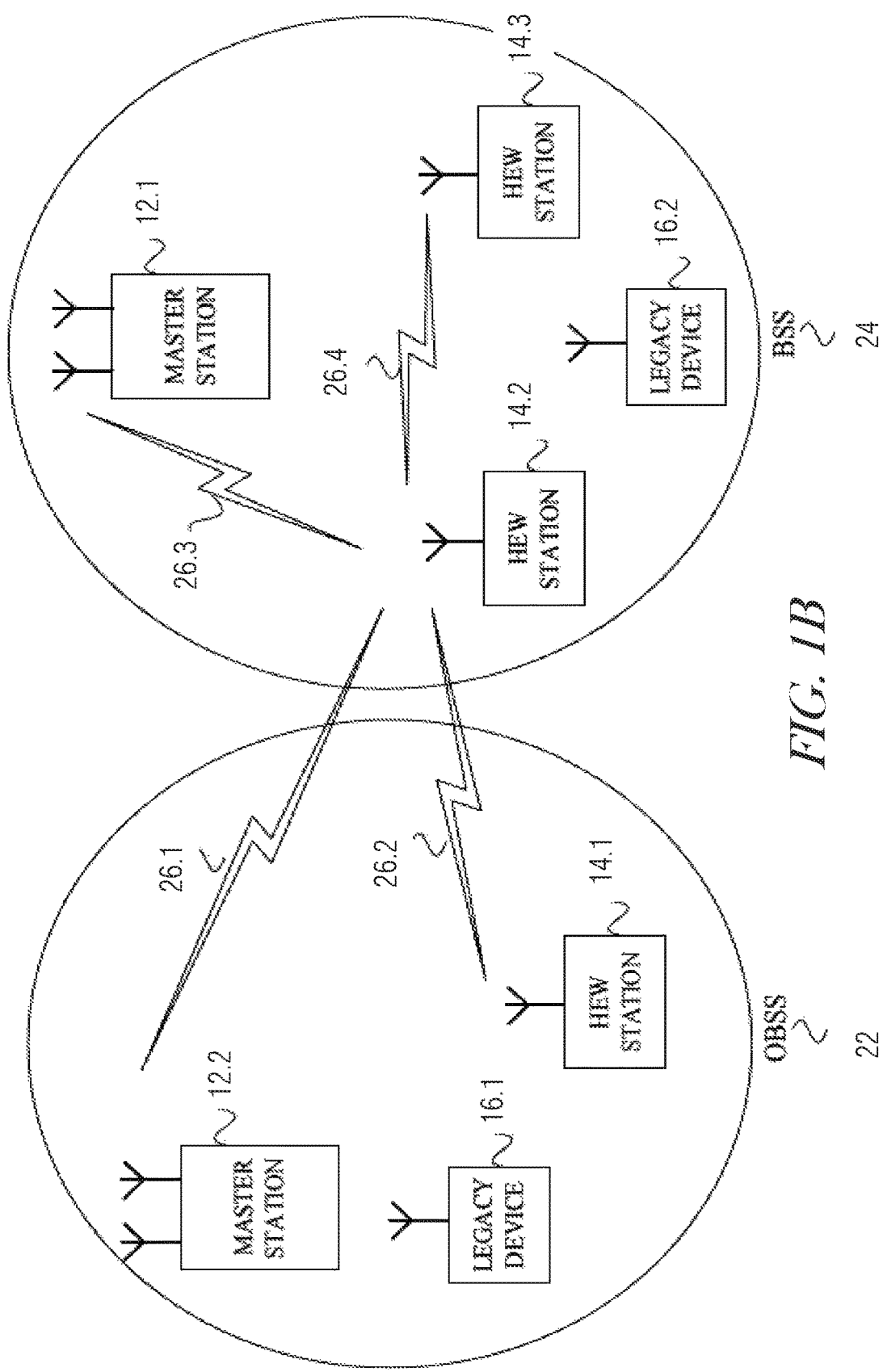
FIG. 1B illustrates a basic service set (BSS) and an overlapping basic service set (OBSS) in accordance with some embodiments.

FIG. 1B illustrates a basic service set (BSS) 204 and an overlapping basic service set (OBSS) 202 in accordance with some examples. Illustrated in FIG. 1B are an OBSS 202 and BSS 204. The OBSS 202 includes one or more master stations 12, one or more HE stations 14, and one or more legacy devices 18. The HE station 14.1 and legacy device 16.1 are associated with the master station 12.2. The master station 12.2 has an identification (not illustrated) for the OBSS 202, which may be termed a BSS identification (BSSID). In some examples, the identification is termed the color of the OBSS 202. The HE station 14.1 stores a MAC address of the master station 12.2. The OBSS 202 is a BSS 10. The OBSS 202 is termed an OBSS 202 to BSS 204 because some of the signals 206 overlap with the BSS 204.

The BSS 204 includes one or more master stations 12, one or more HE stations 14.2, 14.3, and one or more legacy devices 16.2. The HE stations 14.2 and 14.3 and legacy device 16.1 are associated with the master station 12.1. The master station 12.1 has an identification (not illustrated) for the BSS 204, which may be termed a BSSID. In some examples, the identification is termed the color of the BSS 204. The HE stations 14.2 and 14.3 store a MAC address (see FIGS. 3, 4, and 5) of the master station 12.1.

Signal 206.1 is transmitted from the master station 12.2 and received by HE station 14.2. Signal 206.2 is transmitted from HE station 14.1 and received by HE station 14.2. Signal 206.4 is transmitted from the HE station 14.3 and received by HE station 14.2. Signal 206.3 is transmitted by master station 12.1 and received by HE station 14.2. The signals 206 may be packets transmitted by a master station 12, HE station 14, legacy device 16, and/or another wireless device (not illustrated).

In some examples the HE station 14 and/or master station 12 are configured to determine whether or not to use spatial re-use based on whether a signal 206 is from an OBSS 202 or BSS 204. The HE station 14 determines whether the detected frame is an inter-BSS (OBSS 204, signals 206.1 and 206.2) or intra-BSS frame (BSS 204, signals 206.3 and 206.4) by using BSS color, which may be indicated in a physical header (e.g., SIG-A) or MAC address in the MAC header. If the detected frame is an inter BSS frame, under predetermined conditions, the HE station 14 uses a predetermined a power detect level of the OBSS 202 that is greater than the minimum receive sensitivity level to determine whether or not the HE station 14 may perform an action such as spatially reuse the resource the frame is using.

Figure 2:
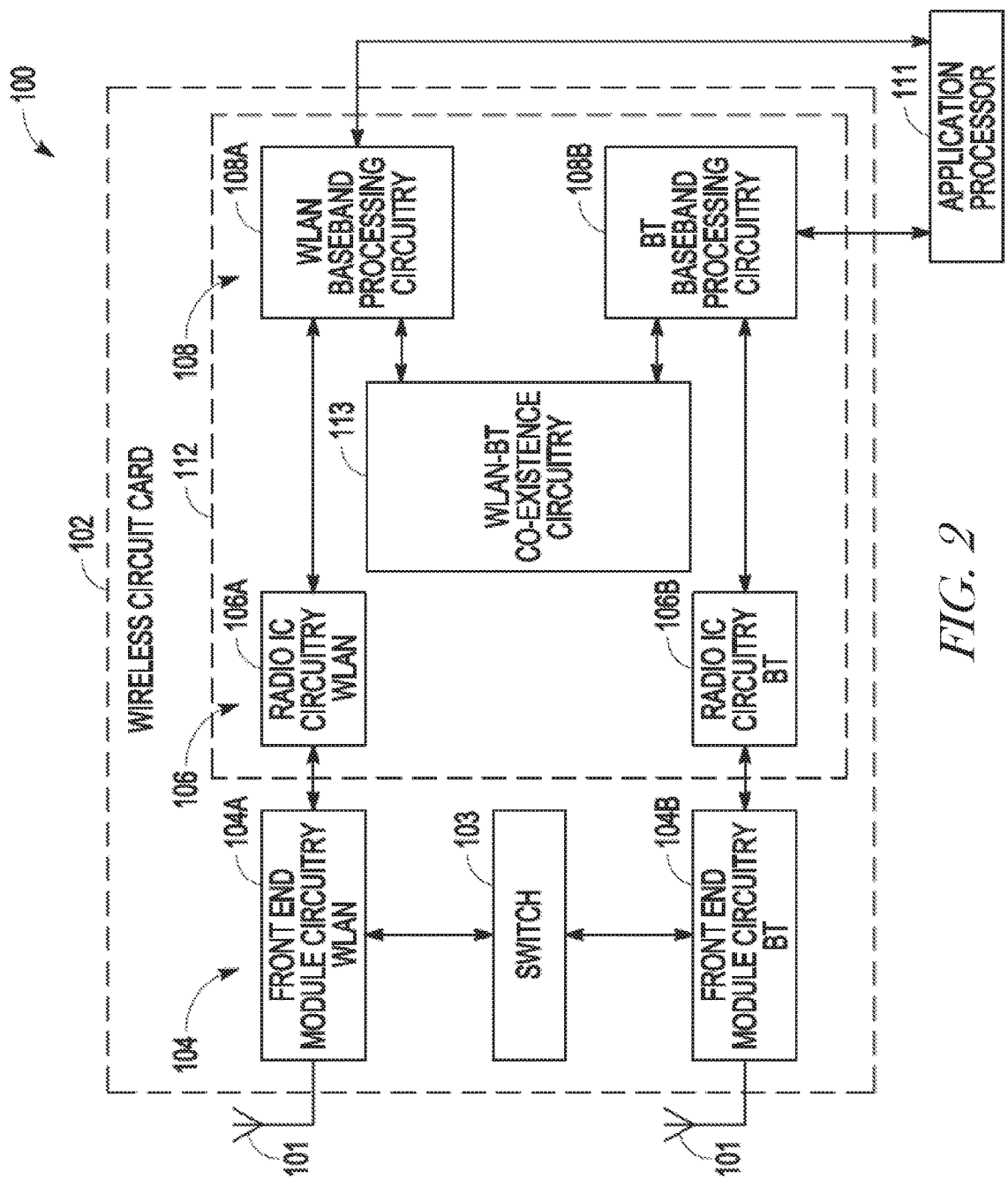
FIG. 2 is a block diagram of a radio architecture in accordance with some embodiments.

FIG. 2 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 2, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 2, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 2, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 2, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 2, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 2, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 3:
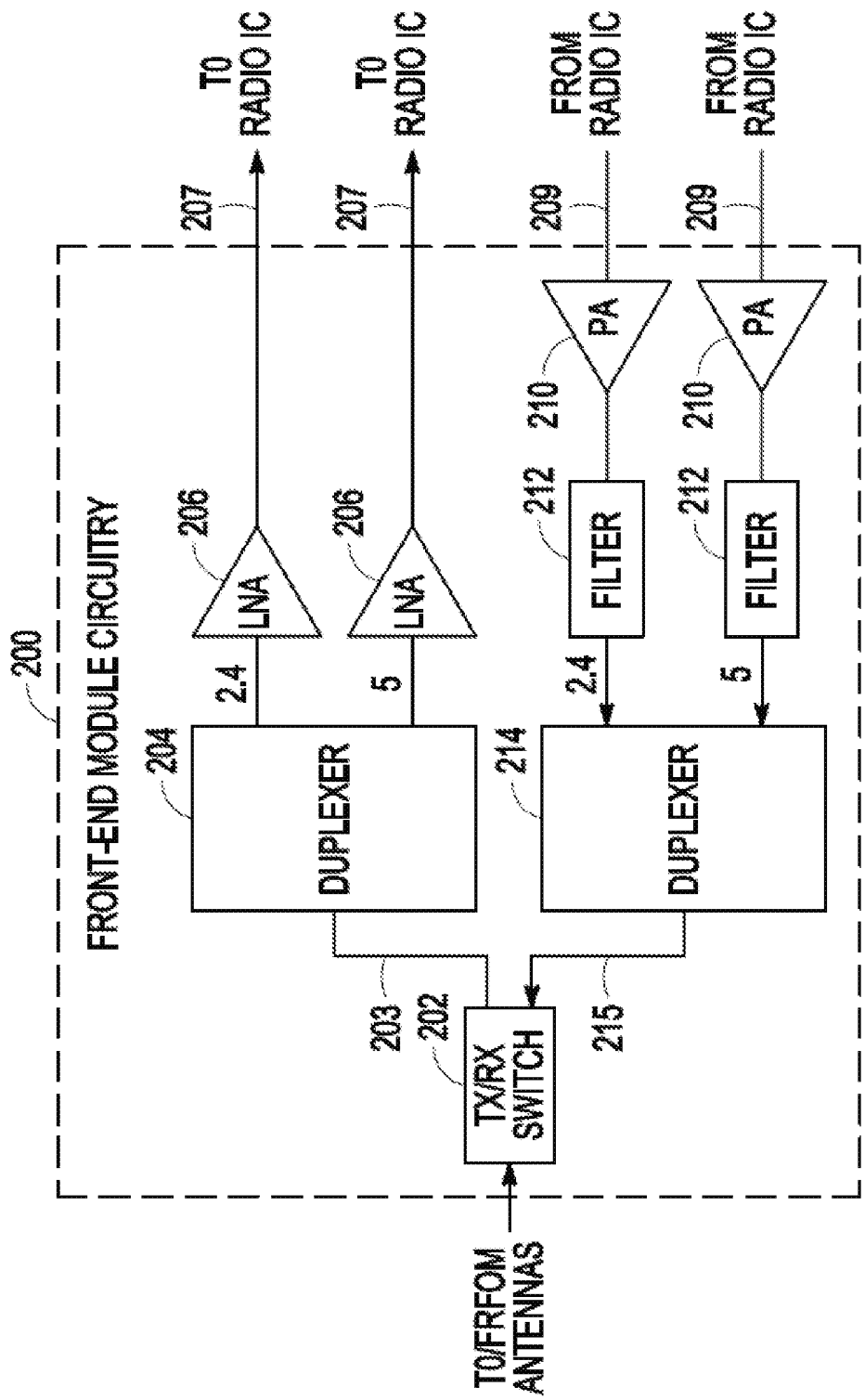
FIG. 3 illustrates a front-end module circuitry for use in the radio architecture of FIG. 2 in accordance with some embodiments.

FIG. 3 illustrates FEM circuitry 200 in accordance with some embodiments. The FEM circuitry 200 is one example of circuitry that may be suitable for use as the WLAN and/or BT FEM circuitry 104A/104B (FIG. 2), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 2)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 2)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 2). In some embodiments, BT communications may utilize the 2.4 GHZ signal paths and may utilize the same FEM circuitry 200 as the one used for WLAN communications.

Figure 4:
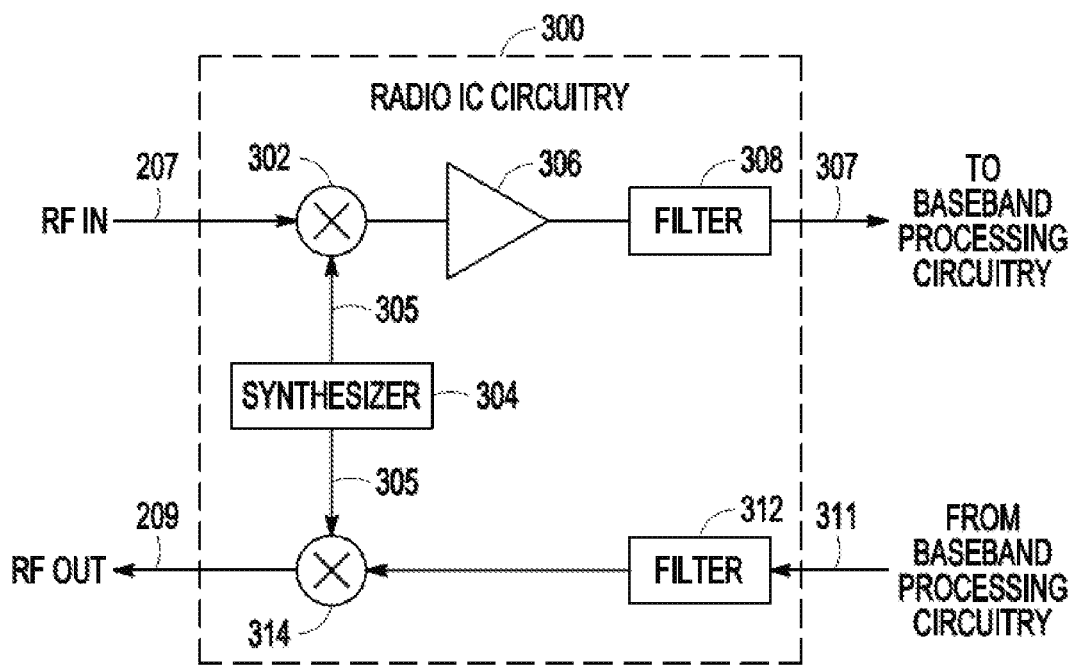
FIG. 4 illustrates a radio IC circuitry for use in the radio architecture of FIG. 2 in accordance with some embodiments.

FIG. 4 illustrates radio IC circuitry 300 in accordance with some embodiments. The radio IC circuitry 300 is one example of circuitry that may be suitable for use as the WLAN or BT radio IC circuitry 106A/106B (FIG. 2), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 4 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 2) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 2) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 4 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer 304 (FIG. 4). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 3) may comprise a balanced signal, although the scope of the embodiments is not limited in this respect. The I and Q baseband output signals may be provided to low-nose amplifier, such as amplifier circuitry 306 (FIG. 4) or to filter circuitry 308 (FIG. 4).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 2) or the application processor 111 (FIG. 2) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 5:
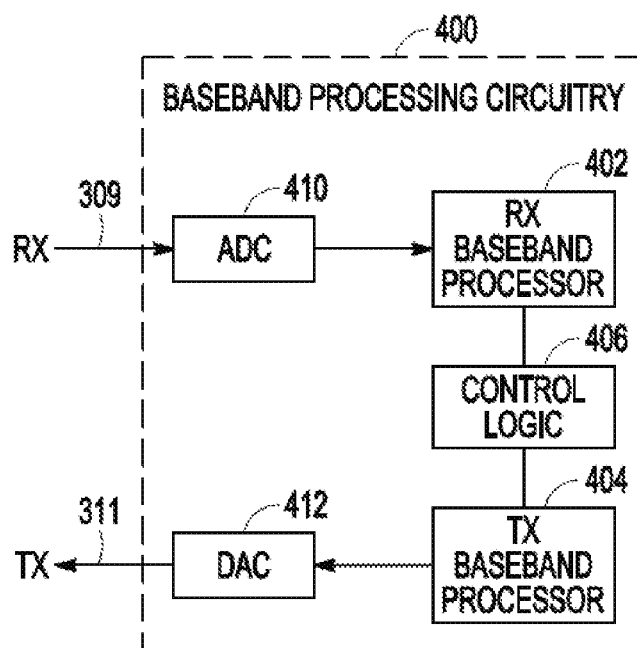
FIG. 5 illustrates a baseband processing circuitry for use in the radio architecture of FIG. 1 in accordance with some embodiments.
Figure 6:
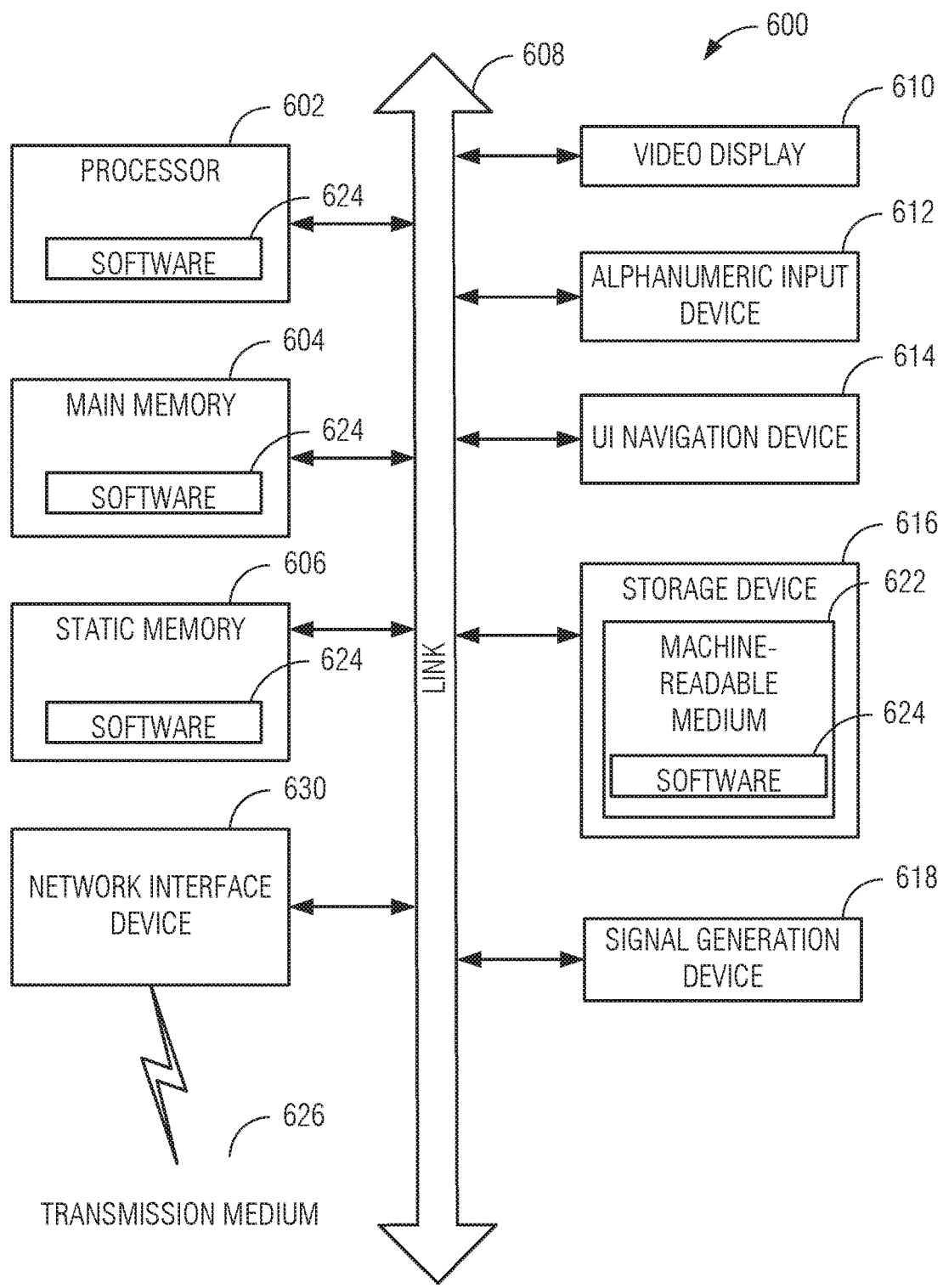
FIG. 6 is a block diagram illustrating an example machine in accordance with some examples, upon which any one or more of the techniques discussed herein may be performed in accordance with some embodiments.

FIG. 5 illustrates a functional block diagram of baseband processing circuitry 400 in accordance with some embodiments. The baseband processing circuitry 400 is one example of circuitry that may be suitable for use as the baseband processing circuitry 108 (FIG. 2), although other circuitry configurations may also be suitable. The baseband processing circuitry 400 may include a receive baseband processor (RX BBP) 402 for processing receive baseband signals 309 provided by the radio IC circuitry 106 (FIG. 2) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 2, in some embodiments, the antennas 101 (FIG. 2) may each comprise one or more directional or omnidirectional antennas, including for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Examples, as described herein, may include, or may operate on, logic or a number of components, circuits, modules, or engines, which for the sake of brevity may be collectively referred to as engines. Engines are tangible entities (e.g., hardware) capable of performing specified operations and may be configured or arranged in a certain manner. In an example, circuits may be arranged (e.g., internally or with respect to external entities such as other circuits) in a specified manner as an engine. In an example, the whole or part of one or more computer systems (e.g., a standalone, client or server computer system) or one or more hardware processors may be configured by firmware or software (e.g., instructions, an application portion, or an application) as an engine that operates to perform specified operations. In an example, the software may reside on a machine readable medium. In an example, the software, when executed by the underlying hardware of the engine, causes the hardware to perform the specified operations.

Accordingly, the term "engine" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which engines are temporarily configured, each of the engines need not be instantiated at any one moment in time. For example, where the engines comprise a general-purpose hardware processor configured using software, the general-purpose hardware processor may be configured as respective different engines at different times. Software may accordingly configure a hardware processor, for example, to constitute a particular engine at one instance of time and to constitute a different engine at a different instance of time.

In certain examples, programming of the machine 600 according to one or more particular algorithms produces a special-purpose machine upon execution of that programming.

Example machine 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The machine 600 may further include a video display unit 610, an alphanumeric input device 612 (e.g., a keyboard), and a user interface (UI) navigation device 614 (e.g., a mouse). In one example, the video display unit 610, input device 612 and UI navigation device 614 are incorporated into a touch screen display. The machine 600 may additionally include a storage device 616 (e.g., a drive unit), a signal generation device 618 (e.g., a speaker), a network interface device (NID) 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the machine 600, with the main memory 604, static memory 606, and the processor 602 also constituting machine-readable media.

While the machine-readable medium 622 is illustrated in an example to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 630 according to various examples may take any suitable form factor. In one such example, NID 620 is in the form of a network interface card (NIC) that interfaces with processor 602 via link 608. In one example, link 608 includes a PCI Express (PCIe) bus, including a slot into which the NIC form-factor may removably engage. In another example, NID 620 is a network interface circuit laid out on a motherboard together with local link circuitry, processor interface circuitry, other input/output circuitry, memory circuitry, storage device and peripheral controller circuitry, and the like. In another example, NID 620 is a peripheral that interfaces with link 608 via a peripheral input/output port such as a universal serial bus (USB) port. NID 620 transmits and receives data over transmission medium 626, which may be wireless (e.g., radio frequency). The instructions 624 may further be transmitted or received over a transmission medium 626 via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a 3GPP Long Term Evolution (LTE) family of standards, a Universal Mobile Telecommunications System (UMTS) family of standards, peer-to-peer (P2P) networks, among others. In an example, the network interface device 620 may include one or more antennas to connect to the transmission medium 626. In an example, the network interface device 620 may include antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine, and includes digital or analog communications signals or other intangible medium to facilitate communication of such software.

Some aspects of the embodiments are directed to a multiband power save technique that enables a device to exchange, on one or more primary bands, power-save mode signaling information about other, secondary, operating bands. This signaling information may entail availability, or power-save resource allocation indicators, or band unavailability request indicators, for example. The power save and resource allocation approach according to these embodiments enables STA devices to adapt the secondary band's service to entirely shut down one or more secondary operation bands, for example, while remaining in a power-save mode at the primary operating band.

According to some aspects of the embodiments, a secondary band availability/power save resource allocation request, and response elements, are defined for a power save protocol that can be transmitted in the primary operating band, indicating a request for power-save service at, or to adjust the availability of, one or more secondary bands.

A STA that calls for power save service/availability may transmit a secondary band availability or power save resource allocation request using the primary operating band. An AP or STA that is to indicate when it can provide a power save service or be available in a secondary band can send a secondary-band availability or power save resource allocation response.

One example embodiment facilitates operations for temporary stopping of the power save service, or defining different multiband power save modes of operation, with different levels of power save at one of the secondary operating bands using secondary band unavailability request and response messaging. This indication may be used for making changes in the power save mode, or for temporarily shutting down the connectivity or traffic at one of the secondary operating bands while maintaining connectivity or traffic on other bands until the connectivity or traffic is to be resumed.

Some embodiments facilitate different multiband power save modes of operation with different levels of power save that include an active mode on the primary band, and a power save mode at one of the secondary bands. The power save operation may include:
- a fully-active mode in which some, or all, secondary bands are active and available for data link transmission (or optionally, link aggregation). As a further option, a sub-mode may have only one high-activity band active for the data path (without link aggregation), with the high-activity band being a secondary band. In a related example, the primary band in this instance may be limited to carrying management messaging and
- a power-save mode in which only the primary band is active and available for data link transmission.

According to an example, a STA acting as a requester seeking to call for secondary service availability or power save mode, may transmit a band availability or resource allocation (ABARA 908) request on the primary band to an AP or STA providing the service, which is referred to as an allocator in the present context. The ABARA-request 908 message may indicate a change in operational parameters to be instituted for one or more secondary bands. Based on the ABARA response 910, both the requester and the allocator may establish a packet exchange on the selected secondary band.

In a related example, a requester STA that seeks service unavailability or power-save mode on a specific secondary band may send a secondary band unavailability (BUA 1108) request on one of the operating bands. As a response to the BUA request 1108, the allocator replies with a BUA response 1110.

According to some embodiments the ABARA-request 908/ABARA-response 910 signaling may be used to trigger a change of the secondary band operating power-save operating mode, and associated timing, in a recipient STA. It may also be used to inform a recipient STA that the originator STA changed its multi-band power-save operating mode.

According to various embodiments the ABARA-request/ABARA-response and BUA-request/BUA-response signaling are implemented using a separate management frame, for instance, as an extension of an operating mode notification (OMN) frame; control information appended to data frames or block acknowledgement (BA) frames, for instance, using an extension of OMI (e.g., ROMI or TOMI) in HE control field, or a new type of HE control field; or any other suitable signaling solution.

According to related embodiments the ABARA-request/ABARA-response and BUA-request/BUA-response signaling may be used to indicate multiband power save mode switch timing, particularly scheduling the time at which changes are to be applied, according to a power-save policy. As an example, this signaling may indicate a predefined lookup index of the selected multiband power-save operating mode. To support this indexing, a set of operating instructions corresponding to different power-save modes may be stored in a data structure in a data storage device of the STA. The power-save modes may be indexed at the time when they are defined in a multiband setup procedure, or the multiband power save setup procedure, for instance.

Figure 7:
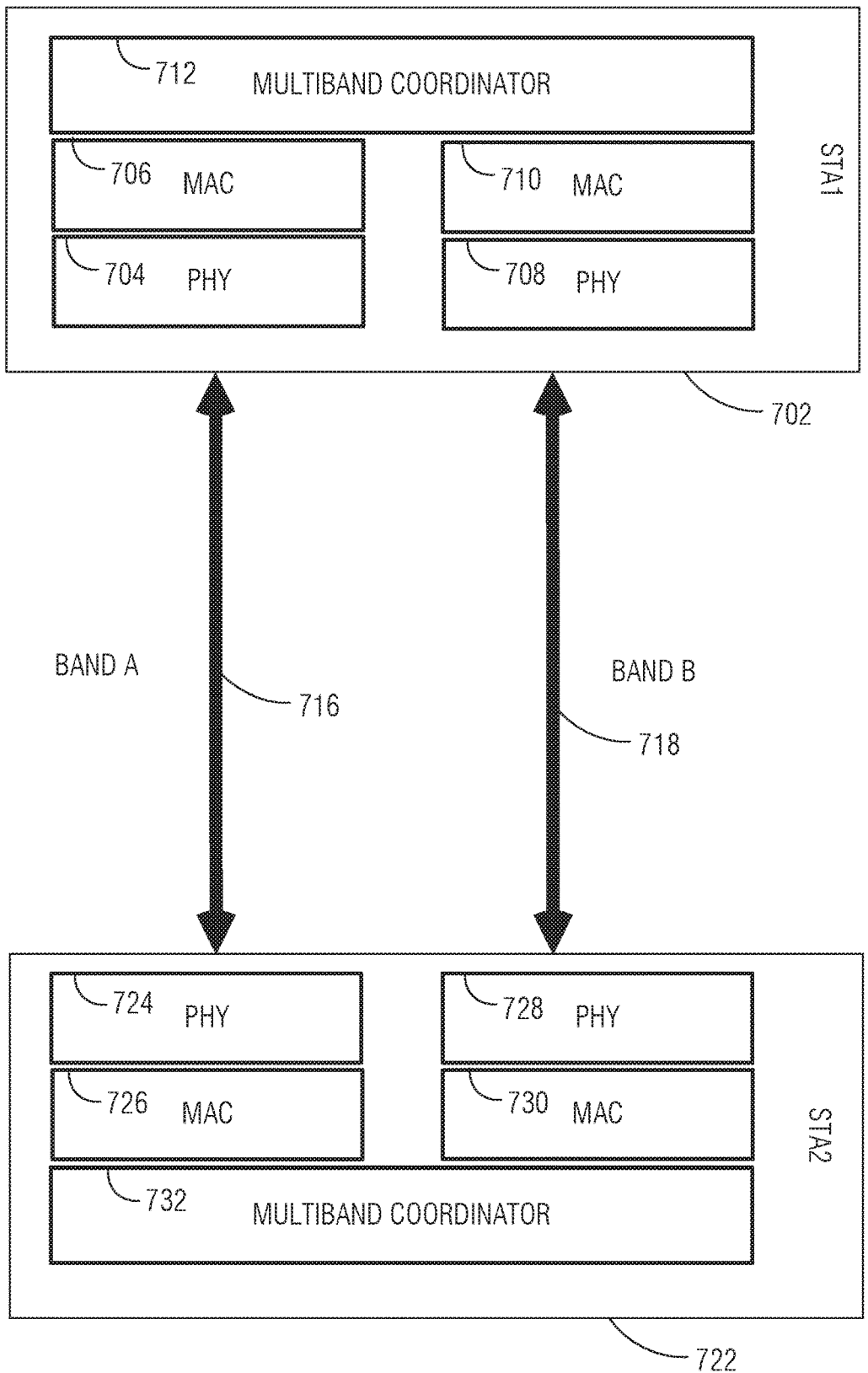
FIG. 7 is a partial system block diagram illustrating a communicating pair of multiband STAs, each of which has facilities for communicating over two bands according to an illustrative example embodiment.

FIG. 7 is a partial system block diagram illustrating a communicating pair of multiband STAs, each of which has facilities for communicating over two bands according to an illustrative example embodiment. As depicted, STA1 702 and STA2 704 communicate over band A 716, and band B 718. Band A 716 and band B 718 may represent different WLAN bands, different UTRAN bands, or some combination of different RANs. STA1 702 has separate PHY and MAC facilities for each of the bands 716, 718. PHY circuitry 704 and MAC processor 706 of STA1 702 facilitate communications over band A 716. PHY circuitry 708 and MAC processor 710 of STA1 702 facilitate communications over band B 718. In similar fashion, PHY circuitry 724 and MAC processor 726 of STA2 722 facilitate communications over band A 716; and PHY circuitry 728 and MAC processor 730 of STA2 722 facilitate communications over band B 718.

Multiband power save coordinator (MB-C) 712 of STA1 702 and MB-C 732 of STA2 722 is each constructed, programmed, or otherwise configured, to implement a power-save policy for the corresponding STA to coordinate power-save operations of the multiple bands supported by the STA. MB-C may perform operations in support of the STA operating as a requester and as an allocator. MB-C 712, 732 each initiates and controls the multiband power-save operation, and coordinates the operation of the respective PHY and MAC resources for each band 716 and 718.

Figure 8:
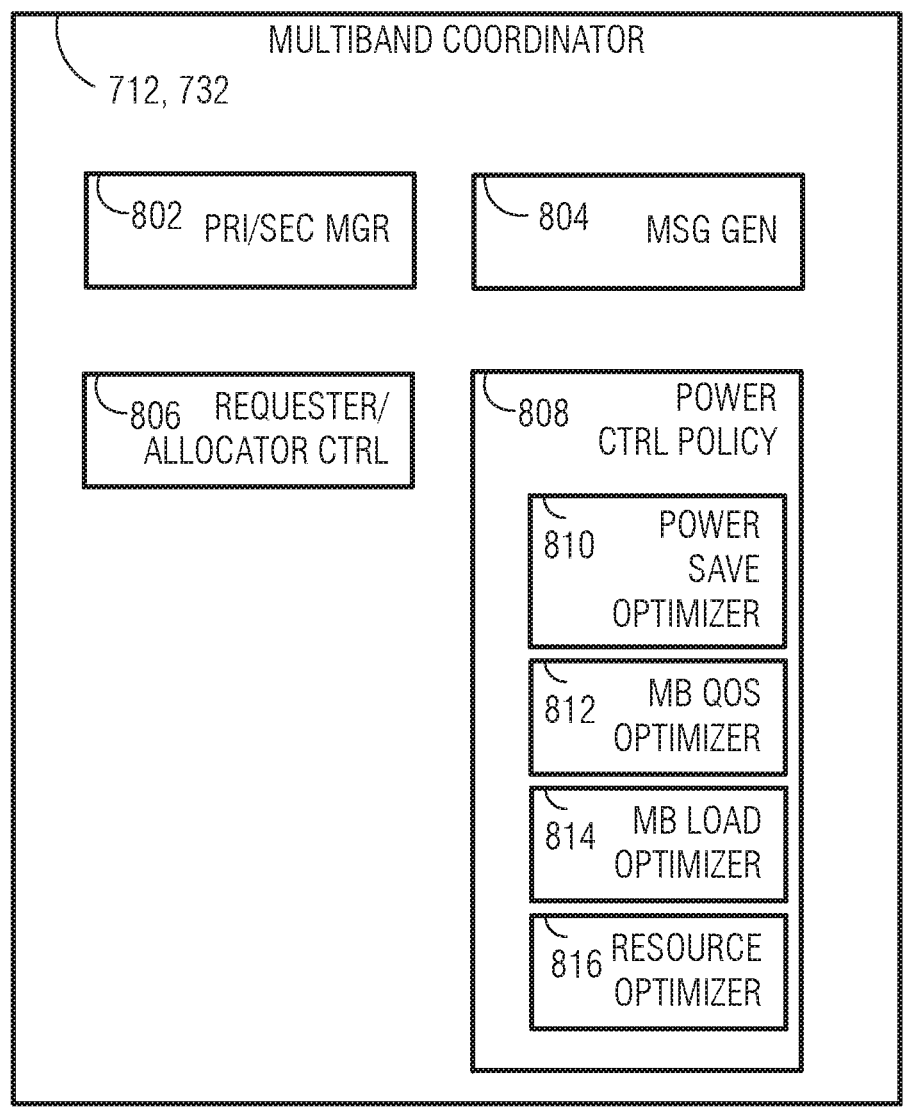
FIG. 8 is a system block diagram illustrating various engines that make up a MB-C according to some embodiments.

FIG. 8 is a system block diagram illustrating various engines that make up a MB-C according to some embodiments. Primary/secondary band manager 802 is constructed, programmed, or otherwise configured, to assign, and re-assign primary or secondary band status to each of the sets of operating band facilities within the corresponding STA device, such as PHY circuitry 704 and 708, and MAC processors 706 and 710 of STA1 702; and PHY circuitry 724 and 728, and MAC processors 726 and 730 of STA2 722 (FIG. 7), such that the facilities associated with each operating band 716, 718 are given either a primary- or secondary-band role in accordance with the examples described herein. Notably, the primary/secondary band assignment is a dynamic state that may be varied based on changing circumstances (e.g., in response to a determination that one band or another offers superior performance or efficiency).

Message generator 804 is constructed, programmed, or otherwise configured, to generate ABARA request/response and BUA request/response messages in furtherance of the power-save operations. When operating as a requester, MB-C 712, 732 is responsible for initiation of the secondary-band ABARA-request or BUA-request messages. When operating as an allocator, MB-C 712, 732 is responsible for initiation of the ABARA-response or BUA-response messages.

Requester/allocator control 806 is constructed, programmed, or otherwise configured, to manage and toggle the operating mode of MB-C 712, 732 between operation in the requester or allocator regimes, based on power-control policy 808, which may include power save optimizer 810, multiband quality of service (QoS) optimizer 812, multiband load optimizer 814, and resource optimizer 816. Power save optimizer 810 may select the operation band, availability pattern, and mode of operation for the STA based on a specific STA request. These parameters may be adjusted according to a set of criteria, such as rules, to limit the link condition, network state condition, high-level service policy, and resource allocation, in order to optimize the specific STA power consumption while balancing the device and network performance. QoS optimizer 812 takes into account QoS demands to ensure that adequate service is being provided to the data-communication needs of the active applications. Multiband load optimizer 814 takes into account congestion in each of the available bands to allocate communication resources in a way that avoids congestion to improve throughput. Resource optimizer 816 takes into account the relative performance of the various bands in view of the current demands for data throughput to contribute additional decision criteria for requester/allocator control 806 to take into account in determining which bands to use actively or to place into a power-save mode.

When operating as a requester, ABARA-request and BUA-request messages may be generated based on any one or more criteria from among: multiband power optimization; multiband QoS (e.g., throughput, latency, etc.) optimization; multiband load optimizations, etc. When operating as an allocator, ABARA-response and BUA-response messages may be generated based on any one or more criteria from among: power optimization, available resource optimization, multiband loading optimization, etc.

According to some examples, the secondary band ABARA-request parameters for power save operation may include: an identifier of the selected secondary band, a type of power-save service to be provided, specific availability pattern, specific PHY and MAC operation parameters (e.g., MCS, NSTS, PHY mode, power, GI, BA windows, MAX number of MPDUs, MAX number of MSDUs, PPDU duration, TXOP duration, and the like), connection and air interface parameters, timing limitation, etc.

According to some examples, the secondary bands ABARA-response parameters for power save operation may include: acknowledgement of receipt of the ABARA-request, resource allocation parameters, the band's air interface parameters, availability timing restrictions, or the like.

As related examples, the secondary band BUA-request parameters for power save operation may include: selected band to be halted, a type of service to be halted, timing limitation, or the like.

According to some examples, the secondary band BUA-response parameters for power save operation may include: acknowledgement of receipt of the BUA-request message, unavailability timing restriction, or the like.

In various embodiments, a set of ABARA/BUA restrictions by defining a value or an operating condition for the set of ABARA/BUA parameters (such as those listed above) may be advertised or negotiated during association, TS establishment or modification, in response to a link condition change, or the like.

According to related embodiments, the secondary band power save availability or power save resource allocation response may be based on the 802.11ax power save/resource allocation signaling (e.g., using signaling in the trigger frame/HE-control, or TWT) while adding the requested secondary bands in which the power-save service will be delivered.

Figure 9:
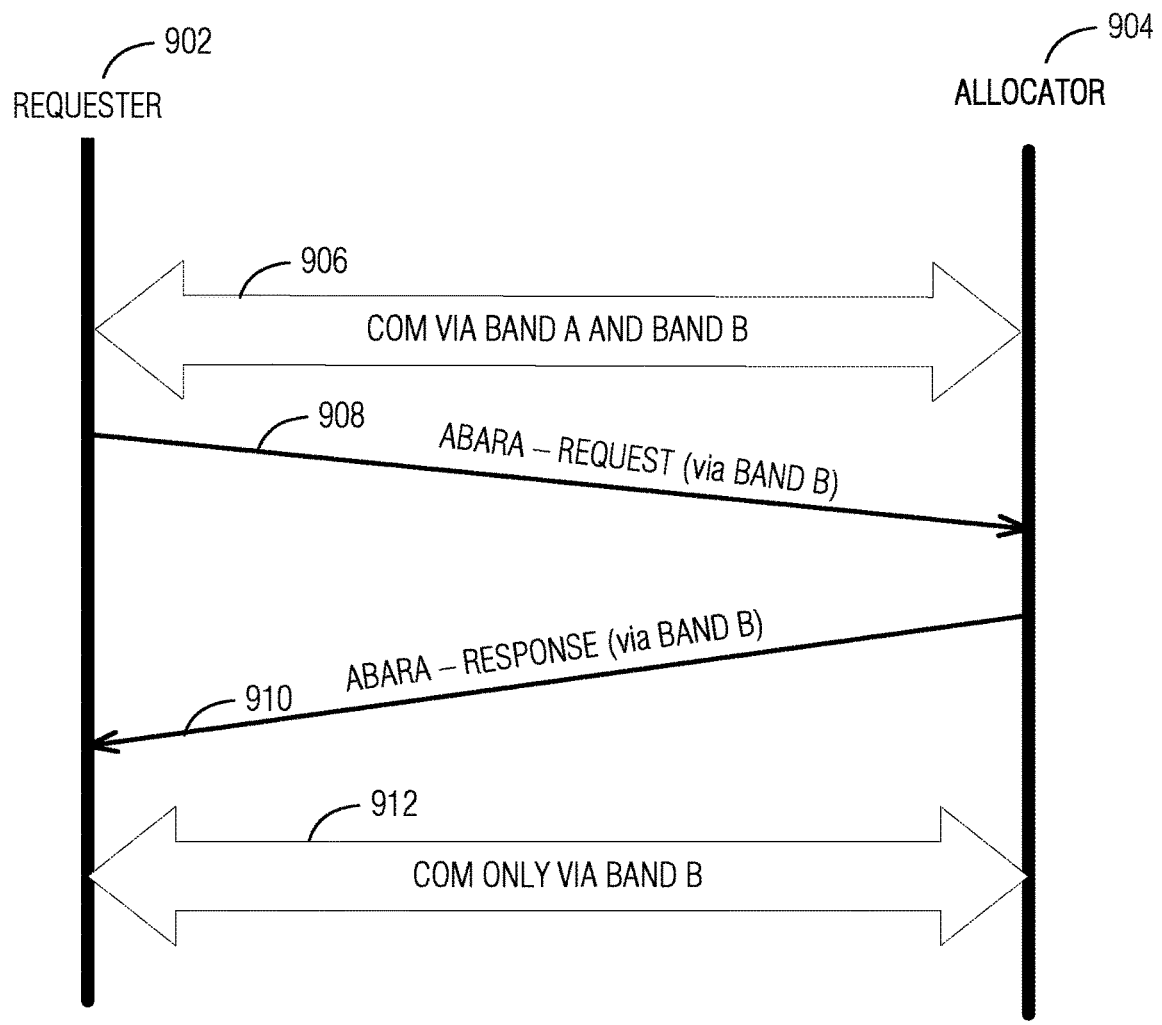
FIG. 9 is a protocol diagram illustrating the exchange of band availability or resource allocation (ABARA) request and response messages between requester and allocator devices over a primary band to effect power-save commands relating to a different band in accordance with some embodiments.

FIG. 9 is a protocol diagram illustrating the exchange of band availability or resource allocation (ABARA) request and response messages over a primary band to effect power-save commands relating to a different, secondary, band. As depicted, requester 902 communicates with allocator 904 using bi-directional communications. Requester 902 in this example may be a STA device, and allocator 904 may be an AP or another STA, for example.

Initially, as indicated at 906, requester 902 and allocator 904 communicate over two bands, A and B, with band B having been designated as a primary band on which power-save control message exchange is to take place. In this example, requester 902 wishes to establish a power-saving state by shutting down band A. Accordingly, at 908, an ABARA-request is sent by requester 902 using band B. The ABARA-request message informs allocator 904 that requester 902 wishes to shut down band A, and may request additional resources for increased communications availability on band B. In response, at 910 allocator 904 responds with an ABARA-response message, also on band B, granting the request. Accordingly, at 912, the communication between requester 902 and allocator 904 proceed over band B, allowing band A to be shut down.

Figure 10:
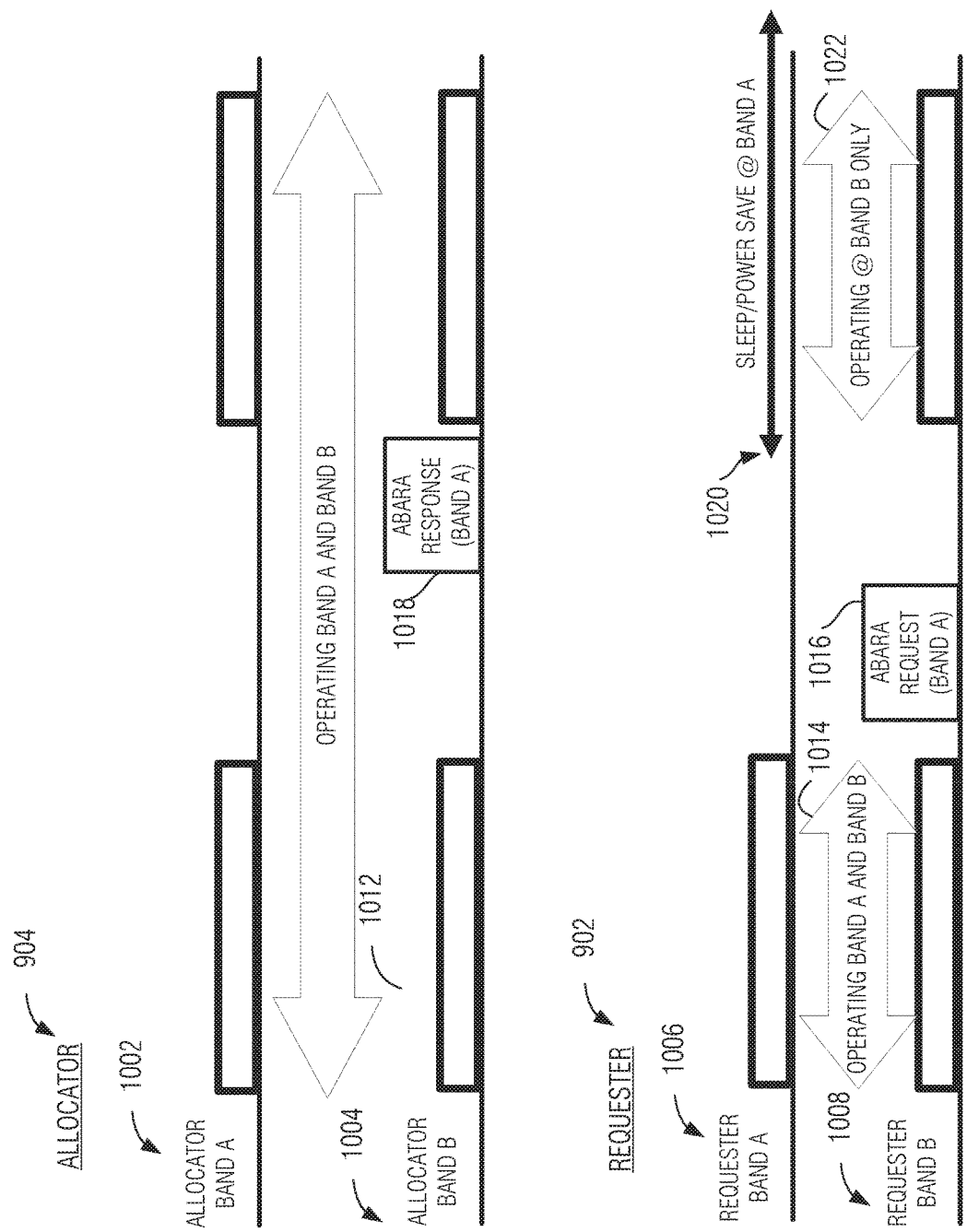
FIG. 10 is a timing diagram illustrating the operation of operational bands of the requester and allocator devices of FIG. 9 in accordance with some embodiments.

These operations are illustrated in greater detail in FIG. 10, which is a timing diagram illustrating the operation of bands A and B of the requester and allocator devices of FIG. 9. The operation over band A 1002 and band B 1004 of allocator 904 is shown on a timeline with the operation of band A 1006 and band B 1008 of requester 902. Initially, requester 902 and allocator 904 communicate using bi-directional communications over band A and band B, as indicated at 1012 and 1014, respectively. At 1016, requester 902 sends an ABARA-request message over band B 1006 to allocator 904. The ABARA-request message may request halting of communications over band A and, optionally, additional resources on band B, such as more OFDM/OFDMA resources, to be allocated.

At 1018, allocator 904 sends an ABARA-response message over band B acknowledging the request, and granting resources for band B. As a result, at 1020, requester 902 enters a power-save mode and suspends band-A operations 1006. As indicated at 1022, requester 902 operates only band B. It should be noted that allocator 904 may continue operation 1002 on band A, which may be used for other purposes, such as communications with other STA devices, for example. Communications with requester 902 that were to occur over band A may now be allocated to resources on band B.

Figure 11:
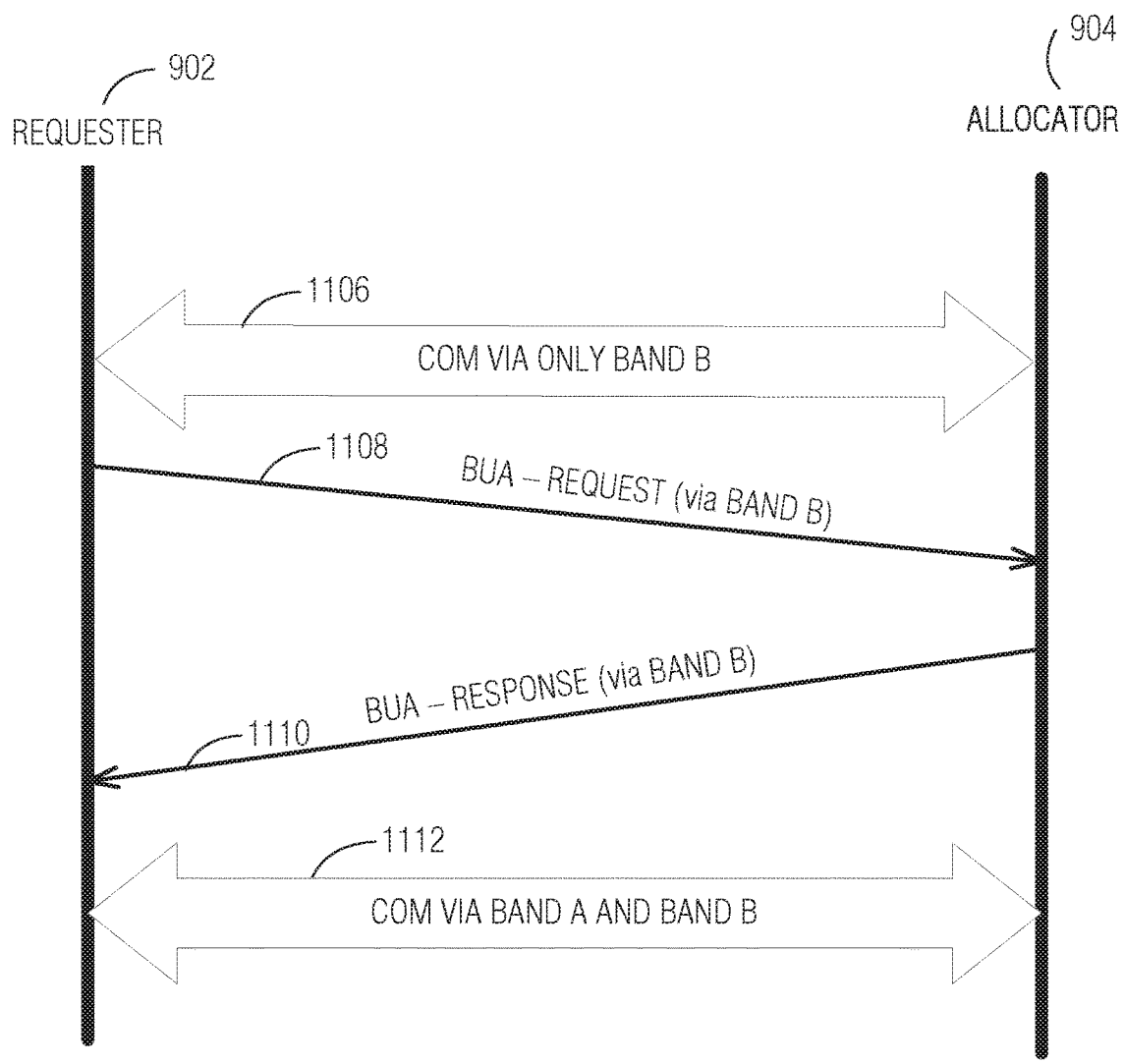
FIG. 11 is a protocol diagram illustrating the exchange of band unavailability (BUA) request and response messages over a primary band to disable power-save commands relating to a different band in accordance with some embodiments.

FIG. 11 is a protocol diagram illustrating the exchange of band unavailability (BUA) request and response messages over a primary band to effect power-save commands relating to a different, secondary band. The requester 902 and allocator 904 devices are as described above; however, in this example operation example, initially, communications between the devices is taking place only over band B, as indicated at 1106. Requester 902 wishes to restore usage of band A. Accordingly, at 1108, requester 902 sends a BUA-request message over band B to allocator 904. The BUA-request message specifies restoration of operation of band A.

In response, allocator sends a BUA-response message at 1110 over band B and allocates resources on band A to reestablish communications. At 1112, with band A restored, communications proceed over both bands, A and B.

Figure 12:
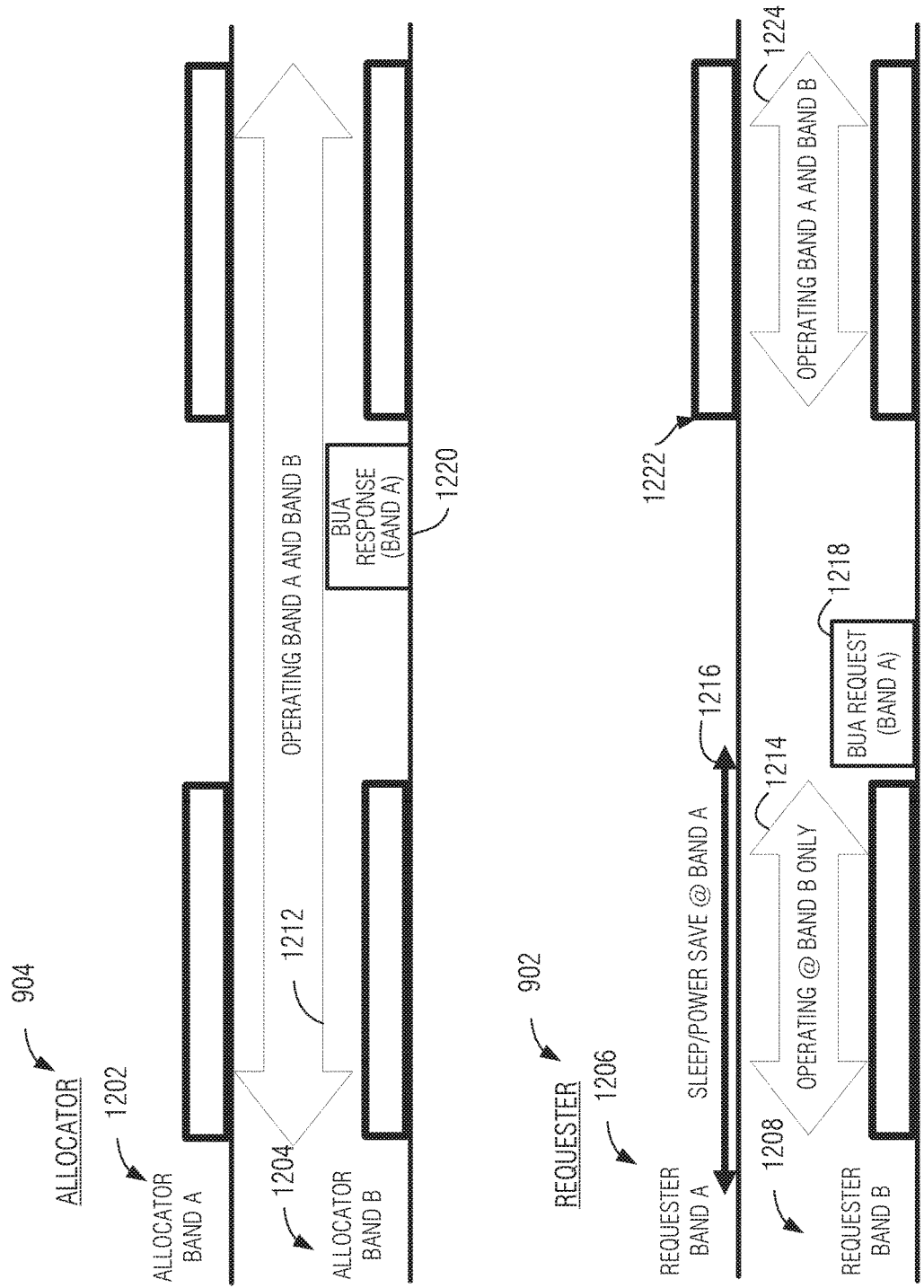
FIG. 12 is a timing diagram illustrating the example of FIG. 11 in greater detail in accordance with some embodiments.

FIG. 12 is a timing diagram illustrating the example of FIG. 11 in greater detail. Band-A operations of allocator 904 are indicated at 1202 and band-B operation of allocator 904 are indicated at 1204. Band-A operations of requester 902 are indicated at 1206 and band-B operations of requester 902 are indicated at 1208. Allocator 904 operates at 1212 using both bands, A and B, for communications. Requester 902 initially operates using only band B at 1214, with band-A operations are suspended at this time in sleep mode for power saving at 1216.

Requester 902 wishes to restore operations on band A. Accordingly, at 1218, requester 902 sends a BUA-request message over the active band, band B. The BUA request identifies band A in the restoration request, and may specify a minimum amount of communication resources to be allocated for band A. Allocator 904 grants the request in this example and, at 1220, sends a BUA-response message (pertaining to band A) over band B. In response to BUA-response message, requester 902 causes band-A operations 1206 to resume at 1222. As indicated at 1224, following the restoration of band-A operations, requester 902 operates using both bands, A and B.

In some related embodiments, existing messaging formats are adapted to incorporate information pertaining to one or more other bands than the band on which the message is being sent and received. For example, a trigger frame defined in 802.11ax, which includes a "common" field and a "user" field may be modified so that one or both of these fields indicates availability and power-save resource allocations pertaining to secondary bands. In another example, the OMN frame may be used with adaptation of the target wake time (TWT) to signal power-save-related requests and responses pertaining to one or more bands other than the band on which the OMN frame is communicated.

In various related embodiments, the STA or AP may each be a requester and allocator. Thus, in the examples described with reference to FIGS. 9-12, the AP may take the role of a requestor seeking to effect a change in the power-save operation of itself, or of one or more STA devices being served. In another related embodiment, the ABARA or BUA request messages may be sent by an AP as advertising signaling, without any expectation of a corresponding ABARA or BUA response message.

ADDITIONAL NOTES & EXAMPLES

Example 1 is an apparatus for a wireless station (STA) for operation in a wireless network, the apparatus comprising: memory; and processing circuitry to: cause the STA to communicate over a first band and a second band, wherein operation of the first band includes operation of a first set of band-specific medium access control processing and physical-layer circuitry of the STA, and wherein operation of the second band includes operation of a second set of band-specific medium access control processing and physical-layer circuitry of the STA; implement a power-save policy for the STA to coordinate power-save operations between the first band and the second band, wherein the power-save policy calls for a change in operational parameters of at least the second band; and generate a power-save request message for transmission to a remote device over the first band wherein a power-save request message indicates the change in operational parameters for the second band according to the power-save policy.

In Example 2, the subject matter of Example 1 optionally includes wherein the power-save request message is to be addressed to a remote device that is a communication resource allocator for the STA.

In Example 3, the subject matter of Example 2 optionally includes wherein the power-save request message is a band availability or resource allocation (ABARA) request message that indicates multiband power-save mode switching to be applied.

In Example 4, the subject matter of any one or more of Examples 2-3 optionally include wherein the power-save request message is a band unavailability (BUA) request message that indicates a request to cease operation on the second band in accordance with a power-save mode.

In Example 5, the subject matter of any one or more of Examples 1-4 optionally include wherein the processing circuitry is to decode a power-save response message transmitted by the remote device over the first band in response to acceptance of the power-save request message by the remote device.

In Example 6, the subject matter of any one or more of Examples 1-5 optionally include -GHz band.

In Example 7, the subject matter of any one or more of Examples 1-6 optionally include wherein the first band and the second band are different operating bands of different communication interfaces according to different radio access networks (RANs).

In Example 8, the subject matter of any one or more of Examples 1-7 optionally include wherein: at a first instance the first band is a primary band and the second band is a secondary band, wherein the primary band is to carry the power-save request message and a response message responsive to the request message; and at a second instance the second band is the primary band and the first band is the secondary band.

In Example 9, the subject matter of any one or more of Examples 1-8 optionally include wherein the power-save request message includes a power-save operating mode index value corresponding to a selected one of a plurality of power-save operating modes that the processing circuitry is configured to implement according to the power-save policy.

In Example 10, the subject matter of any one or more of Examples 1-9 optionally include wherein the power-save request message is included within an operating mode indication (OMI) frame.

In Example 11, the subject matter of any one or more of Examples 1-10 optionally include wherein the power-save request message is included within a management frame.

In Example 12, the subject matter of any one or more of Examples 1-11 optionally include wherein the power-save request message is included within a data packet component.

In Example 13, the subject matter of any one or more of Examples 1-12 optionally include an antenna and transceiver circuitry.

Example 14 is an apparatus for an access point (AP) for operation in a wireless network, the apparatus comprising: memory; and processing circuitry to: cause the AP to communicate over a first band and a second band, wherein operation of the first band includes operation of a first set of band-specific medium access control processing and physical-layer circuitry of the AP, and wherein operation of the second band includes operation of a second set of band-specific medium access control processing and physical-layer circuitry of the AP; and decode a power-save request message for from a remote wireless station (STA) device over the first band wherein a power-save request message indicates a change in operational parameters for the second band according to the power-save policy of the STA that coordinates power-save operations between the first band and the second band, the power-save policy calling for a change in operational parameters of at least the second band; and institute a change in communication resource allocation to the STA for at least the second band in response to the power-save request message.

In Example 15, the subject matter of Example 14 optionally includes wherein the power-save request message is a band availability or resource allocation (ABARA) request message that indicates multiband power-save mode switching to be applied.

In Example 16, the subject matter of any one or more of Examples 14-15 optionally include wherein the power-save request message is a band unavailability (BUA) request message that indicates a request to cease operation on the second band in accordance with a power-save mode.

In Example 17, the subject matter of any one or more of Examples 14-16 optionally include wherein the processing circuitry is to generate a power-save response message to be transmitted over the first band in response to the power-save request message.

In Example 18, the subject matter of any one or more of Examples 14-17 optionally include -GHz band.

In Example 19, the subject matter of any one or more of Examples 14-18 optionally include wherein the first band and the second band are different operating bands of different communication interfaces according to different radio access networks (RANs).

In Example 20, the subject matter of any one or more of Examples 14-19 optionally include wherein: at a first instance the first band is a primary band and the second band is a secondary band, wherein the primary band is to carry the power-save request message and a response message responsive to the request message; and at a second instance the second band is the primary band and the first band is the secondary band.

In Example 21, the subject matter of any one or more of Examples 14-20 optionally include wherein the power-save request message includes a power-save operating mode index value corresponding to a selected one of a plurality of power-save operating modes that the processing circuitry is configured to implement according to the power-save policy of the STA.

In Example 22, the subject matter of any one or more of Examples 14-21 optionally include wherein the power-save request message is received within an operating mode indication (OMI) frame.

In Example 23, the subject matter of any one or more of Examples 14-22 optionally include wherein the power-save request message is received within a management frame.

In Example 24, the subject matter of any one or more of Examples 14-23 optionally include wherein the power-save request message is received within a data packet component.

In Example 25, the subject matter of any one or more of Examples 14-24 optionally include an antenna and transceiver circuitry.

Example 26 is at least one machine-readable medium containing instructions that, when executed on a processor of a wireless station (STA), cause the STA to: communicate over a first band and a second band, wherein operation of the first band includes operation of a first set of band-specific medium access control processing and physical-layer circuitry of the STA, and wherein operation of the second band includes operation of a second set of band-specific medium access control processing and physical-layer circuitry of the STA; implement a power-save policy for the STA to coordinate power-save operations between the first band and the second band, wherein the power-save policy calls for a change in operational parameters of at least the second band, and generate a power-save request message for transmission to a remote device over the first band wherein a power-save request message indicates the change in operational parameters for the second band according to the power-save policy.

In Example 27, the subject matter of Example 26 optionally includes wherein the power-save request message is to be addressed to a remote device that is a communication resource allocator for the STA.

In Example 28, the subject matter of Example 27 optionally includes wherein the power-save request message is a band availability or resource allocation (ABARA) request message that indicates multiband power-save mode switching to be applied.

In Example 29, the subject matter of any one or more of Examples 27-28 optionally include wherein the power-save request message is a band unavailability (BUA) request message that indicates a request to cease operation on the second band in accordance with a power-save mode.

In Example 30, the subject matter of any one or more of Examples 26-29 optionally include instructions to decode a power-save response message transmitted by the remote device over the first band in response to acceptance of the power-save request message by the remote device.

In Example 31, the subject matter of any one or more of Examples 26-30 optionally include -GHz band.

In Example 32, the subject matter of any one or more of Examples 26-31 optionally include wherein the first band and the second band are different operating bands of different communication interfaces according to different radio access networks (RANs).

In Example 33, the subject matter of any one or more of Examples 26-32 optionally include wherein: at a first instance the first band is a primary band and the second band is a secondary band, wherein the primary band is to carry the power-save request message and a response message responsive to the request message; and at a second instance the second band is the primary band and the first band is the secondary band.

In Example 34, the subject matter of any one or more of Examples 26-33 optionally include wherein the power-save request message includes a power-save operating mode index value corresponding to a selected one of a plurality of power-save operating modes to be implemented according to the power-save policy.

In Example 35, the subject matter of any one or more of Examples 26-34 optionally include wherein the power-save request message is included within an operating mode indication (OMI) frame.

In Example 36, the subject matter of any one or more of Examples 26-35 optionally include wherein the power-save request message is included within a management frame.

In Example 37, the subject matter of any one or more of Examples 26-36 optionally include wherein the power-save request message is included within a data packet component.

Example 38 is at least one machine-readable medium containing instructions that, when executed on a processor of an access point (AP), cause the AP to: communicate over a first band and a second band, wherein operation of the first band includes operation of a first set of band-specific medium access control processing and physical-layer circuitry of the AP, and wherein operation of the second band includes operation of a second set of band-specific medium access control processing and physical-layer circuitry of the AP; and decode a power-save request message for from a remote wireless station (STA) device over the first band wherein a power-save request message indicates a change in operational parameters for the second band according to the power-save policy of the STA that coordinates power-save operations between the first band and the second band, the power-save policy calling for a change in operational parameters of at least the second band; and institute a change in communication resource allocation to the STA for at least the second band in response to the power-save request message.

In Example 39, the subject matter of Example 38 optionally includes wherein the power-save request message is a band availability or resource allocation (ABARA) request message that indicates multiband power-save mode switching to be applied.

In Example 40, the subject matter of any one or more of Examples 38-39 optionally include wherein the power-save request message is a band unavailability (BUA) request message that indicates a request to cease operation on the second band in accordance with a power-save mode.

In Example 41, the subject matter of any one or more of Examples 38-40 optionally include instructions to generate a power-save response message to be transmitted over the first band in response to the power-save request message.

In Example 42, the subject matter of any one or more of Examples 38-41 optionally include -GHz band.

In Example 43, the subject matter of any one or more of Examples 38-42 optionally include wherein the first band and the second band are different operating bands of different communication interfaces according to different radio access networks (RANs).

In Example 44, the subject matter of any one or more of Examples 38-43 optionally include wherein: at a first instance the first band is a primary band and the second band is a secondary band, wherein the primary band is to carry the power-save request message and a response message responsive to the request message; and at a second instance the second band is the primary band and the first band is the secondary band.

In Example 45, the subject matter of any one or more of Examples 38-44 optionally include wherein the power-save request message includes a power-save operating mode index value corresponding to a selected one of a plurality of power-save operating modes to be implemented according to the power-save policy of the STA.

In Example 46, the subject matter of any one or more of Examples 38-45 optionally include wherein the power-save request message is received within an operating mode indication (OMI) frame.

In Example 47, the subject matter of any one or more of Examples 38-46 optionally include wherein the power-save request message is received within a management frame.

In Example 48, the subject matter of any one or more of Examples 38-47 optionally include wherein the power-save request message is received within a data packet component.

Example 49 is a system for coordinating power-save operations of a wireless station (STA), the system comprising: means for communicating over a first band and a second band, wherein operation of the first band includes operation of a first set of band-specific medium access control processing and physical-layer circuitry of the STA, and wherein operation of the second band includes operation of a second set of band-specific medium access control processing and physical-layer circuitry of the STA; means for implementing a power-save policy for the STA to coordinate power-save operations between the first band and the second band, wherein the power-save policy calls for a change in operational parameters of at least the second band; and means for generating a power-save request message for transmission to a remote device over the first band wherein a power-save request message indicates the change in operational parameters for the second band according to the power-save policy.

In Example 50, the subject matter of Example 49 optionally includes wherein the power-save request message is to be addressed to a remote device that is a communication resource allocator for the STA.

In Example 51, the subject matter of Example 50 optionally includes wherein the power-save request message is a band availability or resource allocation (ABARA) request message that indicates multiband power-save mode switching to be applied.

In Example 52, the subject matter of any one or more of Examples 50-51 optionally include wherein the power-save request message is a band unavailability (BUA) request message that indicates a request to cease operation on the second band in accordance with a power-save mode.

In Example 53, the subject matter of any one or more of Examples 49-52 optionally include means for decoding a power-save response message transmitted by the remote device over the first band in response to acceptance of the power-save request message by the remote device.

In Example 54, the subject matter of any one or more of Examples 49-53 optionally include -GHz band.

In Example 55, the subject matter of any one or more of Examples 49-54 optionally include wherein the first band and the second band are different operating bands of different communication interfaces according to different radio access networks (RANs).

In Example 56, the subject matter of any one or more of Examples 49-55 optionally include wherein: at a first instance the first band is a primary band and the second band is a secondary band, wherein the primary band is to carry the power-save request message and a response message responsive to the request message; and at a second instance the second band is the primary band and the first band is the secondary band.

In Example 57, the subject matter of any one or more of Examples 49-56 optionally include wherein the power-save request message includes a power-save operating mode index value corresponding to a selected one of a plurality of power-save operating modes to be implemented according to the power-save policy.

In Example 58, the subject matter of any one or more of Examples 49-57 optionally include wherein the power-save request message is included within an operating mode indication (OMI) frame.

In Example 59, the subject matter of any one or more of Examples 49-58 optionally include wherein the power-save request message is included within a management frame.

In Example 60, the subject matter of any one or more of Examples 49-59 optionally include wherein the power-save request message is included within a data packet component.

Example 61 is a system for coordinating power-save operations of an access point (AP), the system comprising: means for communicating over a first band and a second band, wherein operation of the first band includes operation of a first set of band-specific medium access control processing and physical-layer circuitry of the AP, and wherein operation of the second band includes operation of a second set of band-specific medium access control processing and physical-layer circuitry of the AP; and means for decoding a power-save request message for from a remote wireless station (STA) device over the first band wherein a power-save request message indicates a change in operational parameters for the second band according to the power-save policy of the STA that coordinates power-save operations between the first band and the second band, the power-save policy calling for a change in operational parameters of at least the second band; and means for instituting a change in communication resource allocation to the STA for at least the second band in response to the power-save request message.

In Example 62, the subject matter of Example 61 optionally includes wherein the power-save request message is a band availability or resource allocation (ABARA) request message that indicates multiband power-save mode switching to be applied.

In Example 63, the subject matter of any one or more of Examples 61-62 optionally include wherein the power-save request message is a band unavailability (BUA) request message that indicates a request to cease operation on the second band in accordance with a power-save mode.

In Example 64, the subject matter of any one or more of Examples 61-63 optionally include means for generating a power-save response message to be transmitted over the first band in response to the power-save request message.

In Example 65, the subject matter of any one or more of Examples 61-64 optionally include -GHz band.

In Example 66, the subject matter of any one or more of Examples 61-65 optionally include wherein the first band and the second band are different operating bands of different communication interfaces according to different radio access networks (RANs).

In Example 67, the subject matter of any one or more of Examples 61-66 optionally include wherein: at a first instance the first band is a primary band and the second band is a secondary band, wherein the primary band is to carry the power-save request message and a response message responsive to the request message; and at a second instance the second band is the primary band and the first band is the secondary band.

In Example 68, the subject matter of any one or more of Examples 61-67 optionally include wherein the power-save request message includes a power-save operating mode index value corresponding to a selected one of a plurality of power-save operating modes to be implemented according to the power-save policy of the STA.

In Example 69, the subject matter of any one or more of Examples 61-68 optionally include wherein the power-save request message is received within an operating mode indication (OMI) frame.

In Example 70, the subject matter of any one or more of Examples 61-69 optionally include wherein the power-save request message is received within a management frame.

In Example 71, the subject matter of any one or more of Examples 61-70 optionally include wherein the power-save request message is received within a data packet component.

Example 72 is a method for coordinating power-save operations of a wireless station (STA), the method comprising: communicating, by the STA, over a first band and a second band, wherein operation of the first band includes operation of a first set of band-specific medium access control processing and physical-layer circuitry of the STA, and wherein operation of the second band includes operation of a second set of band-specific medium access control processing and physical-layer circuitry of the STA; implementing a power-save policy by the STA to coordinate power-save operations between the first band and the second band, wherein the power-save policy calls for a change in operational parameters of at least the second band; and generating, by the STA, a power-save request message for transmission to a remote device over the first band wherein a power-save request message indicates the change in operational parameters for the second band according to the power-save policy.

Example 73 is a method for coordinating power-save operations of an access point (AP), the method comprising communicating, by the AP, over a first band and a second band, wherein operation of the first band includes operation of a first set of band-specific medium access control processing and physical-layer circuitry of the AP, and wherein operation of the second band includes operation of a second set of band-specific medium access control processing and physical-layer circuitry of the AP; and decoding, by the AP, a power-save request message for from a remote wireless station (STA) device over the first band wherein a power-save request message indicates a change in operational parameters for the second band according to the power-save policy of the STA that coordinates power-save operations between the first band and the second band, the power-save policy calling for a change in operational parameters of at least the second band; and instituting, by the AP, a change in communication resource allocation to the STA for at least the second band in response to the power-save request message.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus for a wireless station (STA) configured for multi-band operation in a wireless local area network (WLAN) comprising a basic service set (BSS) that includes the STA and a remote device comprising an access point (AP), the apparatus comprising:
    memory; and processing circuitry to:
        configure the STA for communications over a first band and a second band, wherein communications over the first band includes operation of a first set of band-specific medium access control processing for the first band, and wherein communications over the second band includes operation of a second set of band-specific medium access control processing for the second band;
        implement a power-save policy for the STA to coordinate power-save operations between the first band and the second band, wherein the power-save policy calls for a change in operational parameters of at least the second band; and
        generate a power-save request message for transmission to the remote device over the first band wherein the power-save request message indicates the change in operational parameters for the second band according to the power-save policy,
    wherein in response to a determination of unavailability of the second band, the processing circuitry is configured to encode the power-save request message as a band unavailability (BUA) request message requesting to cease operation on the second band in accordance with the power-save policy, and
    wherein in response to a determination of availability of the second band, the processing circuitry is configured to encode the power-save request message as a band availability resource allocation (ABARA) request message that indicates that the second band is available, that resources on the second band are requested, and that multiband power-save mode switching is to be applied in accordance with the power-save policy.

2. The apparatus of claim 1, wherein the power-save request message is to be addressed to the remote device that is a communication resource allocator for the STA.

3. The apparatus of claim 1, wherein if the second band is utilized by an overlapping BSS (OBSS), and
    wherein the availability or unavailability of the second band is determined based on a color indicated in OBSS packets.

4. The apparatus of claim 1, wherein the processing circuitry is to decode a power-save response message transmitted by the remote device over the first band in response to acceptance of the power-save request message by the remote device.

5. The apparatus of claim 1, wherein:
    at a first instance the first band is a primary band and the second band is a secondary band, wherein the primary band is to carry the power-save request message and a response message responsive to the request message; and
    at a second instance the second band is the primary band and the first band is the secondary band.

6. The apparatus of claim 1, wherein the power-save request message is encoded by the processing circuitry to include a power-save operating mode index value corresponding to a selected one of a plurality of power-save operating modes that the processing circuitry is configured to implement according to the power-save policy.

7. The apparatus of claim 1, further comprising an antenna and transceiver circuitry.

8. At least one non-transitory machine-readable medium containing instructions that, when executed on a processor of a wireless station (STA) configured for multi-band operations in a wireless local area network (WLAN) comprising a basic service set (BSS) that includes the STA and a remote device comprising an access point (AP), wherein the instructions:
    configure the STA for communications over a first band and a second band, wherein communications over the first band includes operation of a first set of band-specific medium access control processing for the first band, and wherein communications over the second band includes operation of a second set of band-specific medium access control processing for the second band;
    implement a power-save policy for the STA to coordinate power-save operations between the first band and the second band, wherein the power-save policy calls for a change in operational parameters of at least the second band; and
    generate a power-save request message for transmission to the remote device over the first band, wherein the power-save request message indicates the change in operational parameters for the second band according to the power-save policy, wherein in response to a determination of unavailability of the second band, the processing circuitry is configured to encode the power-save request message as a band unavailability (BUA) request message requesting to cease operation on the second band in accordance with the power-save policy, and wherein in response to a determination of availability of the second band, the processing circuitry is configured to encode the power-save request message as a band availability resource allocation (ABARA) request message that indicates that the second band is available, that resources on the second band are requested, and that multiband power-save mode switching is to be applied in accordance with the power-save policy.

9. The at least one machine-readable medium of claim 8, wherein the power-save request message is to be addressed to the remote device that is a communication resource allocator for the STA.

10. The at least one machine-readable medium of claim 9, wherein if the second band is utilized by an overlapping BSS (OBSS), and wherein the availability or unavailability of the second band is determined based on a color indicated in OBSS packets.

11. The at least one machine-readable medium of claim 8, further comprising instructions to decode a power-save response message transmitted by the remote device over the first band in response to acceptance of the power-save request message by the remote device.

12. The at least one machine-readable medium of claim 8, wherein:

at a first instance the first band is a primary band and the second band is a secondary band, wherein the primary band is to carry the power-save request message and a response message responsive to the request message; and at a second instance the second band is the primary band and the first band is the secondary band.

* * * * *